A. SUNDH.
CHAIN GEAR STEERING APPARATUS.
APPLICATION FILED JAN. 18, 1908.

962,268.

Patented June 21, 1910.
3 SHEETS—SHEET 1.

WITNESSES:
INVENTOR
ATTORNEY

A. SUNDH.
CHAIN GEAR STEERING APPARATUS.
APPLICATION FILED JAN. 18, 1908.

962,268.

Patented June 21, 1910.
3 SHEETS—SHEET 2.

Witnesses:
Ernest L. Gale Jr.
James G. Bethell

Inventor
August Sundh
By
C. M. Nissen Attorney

A. SUNDH.
CHAIN GEAR STEERING APPARATUS.
APPLICATION FILED JAN. 18, 1908.

962,268.

Patented June 21, 1910.
3 SHEETS—SHEET 3.

Witnesses:
Ernest L. Gale Jr.
James C. Bethell

Inventor
August Sundh
By
C. M. Nissen
Attorney

UNITED STATES PATENT OFFICE.

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

CHAIN-GEAR STEERING APPARATUS.

962,268.  Specification of Letters Patent. Patented June 21, 1910.

Application filed January 18, 1908. Serial No. 411,431.

*To all whom it may concern:*

Be it known that I, AUGUST SUNDH, a citizen of the United States, residing at Yonkers, in the county of Westchester and State of New York, have invented a new and useful Improvement in Chain-Gear Steering Apparatus, of which the following is a specification.

My invention relates to steering apparatus, particularly to steering-gear mechanism for vessels, and one of its objects is to provide simple and efficient means for controlling such steering gear.

A further object of my invention is the provision of improved and effective means for actuating the rudder of a vessel.

Other objects will appear hereinafter, the novel combinations of elements being set forth in the claims.

Figure 1:
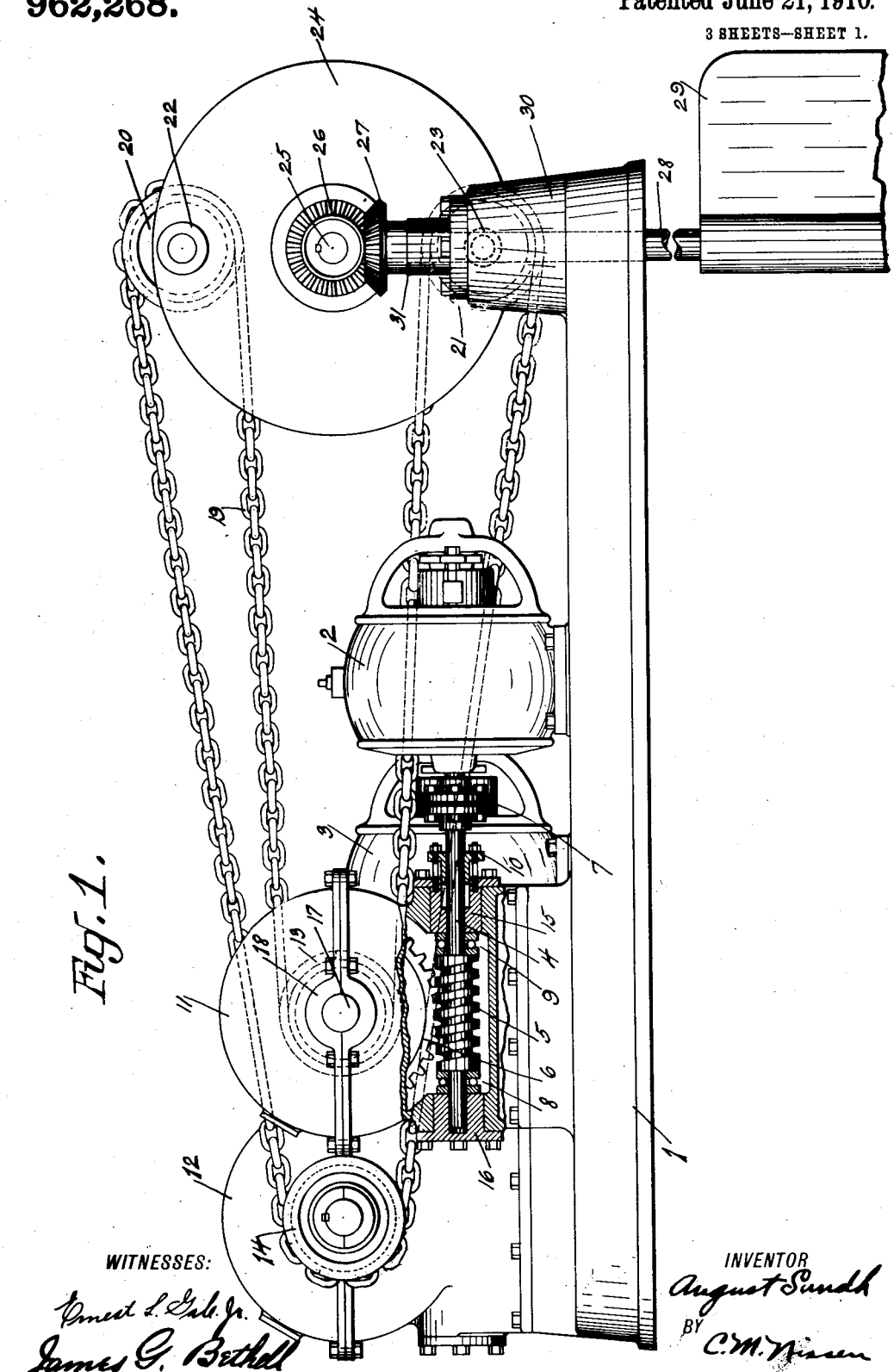
Figure 2:
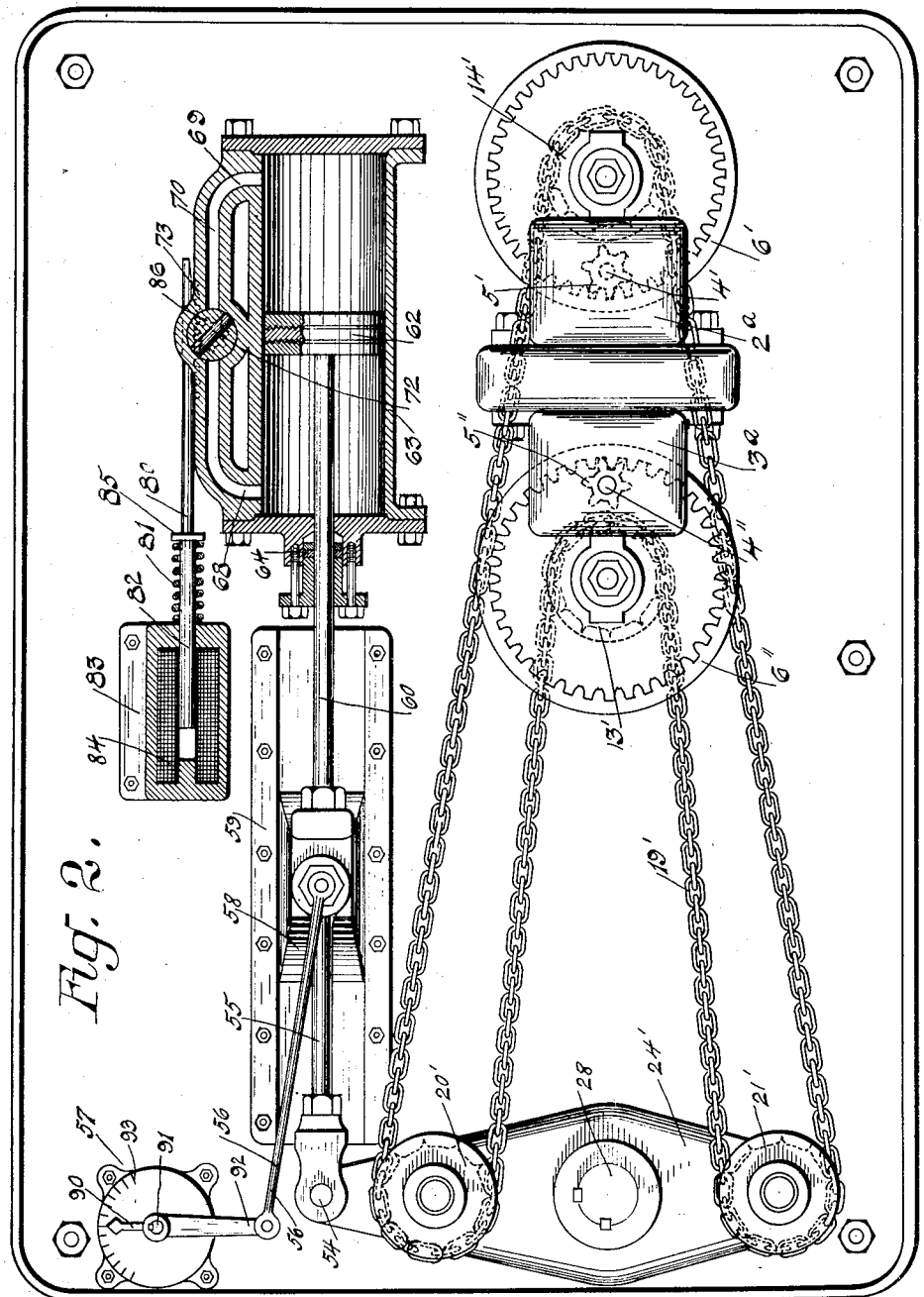
Figure 3:
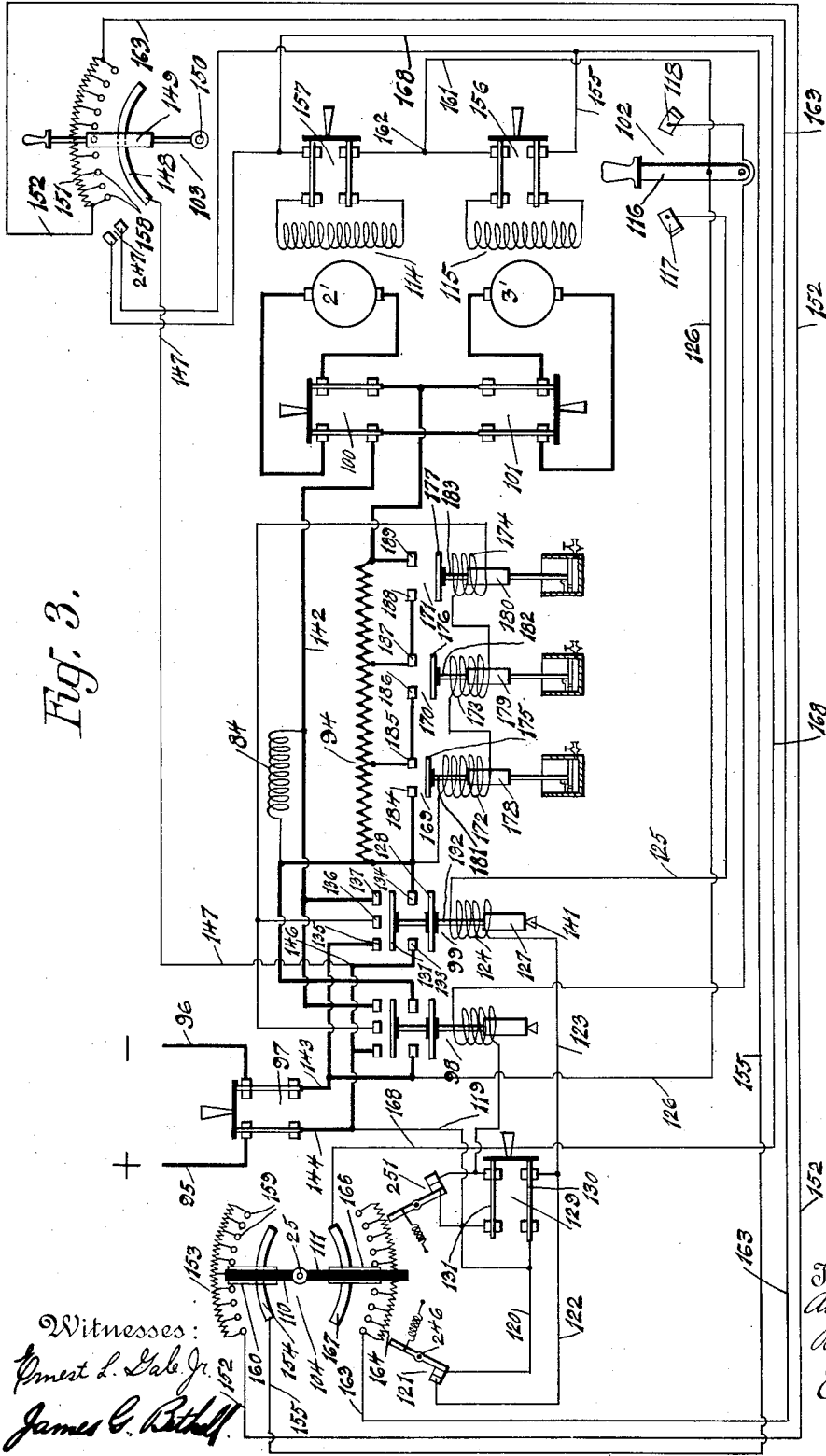

Referring to the drawings, Figure 1 is an elevational view of a steering gear apparatus embodying my invention, having certain portions broken away so as to illustrate clearly the preferred construction; Fig. 2 is a plan view of a modification; and Fig. 3 is a wiring diagram showing the electrical circuits used in connection with my apparatus.

Like characters of reference denote similar parts in each of the figures.

1 designates a suitable base on which the steering gear apparatus is mounted. Secured to this base are shown two direct current motors 2 and 3, each of which is arranged to drive, through suitable mechanism, chain pulleys 13 and 14, respectively. Since the mechanical connections between the motors 2 and 3 and their respective chain pulleys 13 and 14 are similar in every respect, a description of one will suffice for the other. The motor 2 is connected by its armature shaft to a coupling 7 which is preferably an insulating coupling and is herein shown as such. This coupling 7 is also connected to a worm-shaft 4 which extends through a stuffing box 10, journal bearings 15 and 16 and the ball thrust bearings 9 and 8. The journal bearings 15 and 16 support the worm-shaft, while the ball bearings take up the direct end thrusts of the worm 5. The latter is securely fastened to the worm-shaft 4 in any suitable manner or may be integral therewith, and the same meshes with a worm wheel 6 contained in the casing 11. A shaft 17 is keyed or otherwise securely connected to the worm wheel 6 and is adapted to rotate in bearings 18 forming part of the casing 11. This shaft 17 is rigidly connected to the chain pulley 13 which is shown in dotted lines directly back of the casing 11. The motor 3 is connected through a similar worm and worm wheel to a chain pulley 14 which is shown in front of the casing 12. The chain pulleys 13 and 14 are preferably arranged in substantially the same vertical plane.

At the right-hand end of the base 1 is a raised portion 30 carrying at its upper end a bearing 31 for the rudder post 28 of the rudder 29. At the top of the post 28 is connected a bevel gear 27 which meshes with a bevel gear 26, which latter is keyed or otherwise securely fastened to a shaft 25 and wheel 24. The shaft 25 and wheel 24 are adapted to rotate in suitable bearings not shown on the drawing.

At diametrically opposite points on the wheel 24 are mounted chain wheels 20 and 21, so arranged as to rotate freely about their supporting bearings 22 and 23, respectively. These chain wheels 20 and 21, together with the chain wheels 13 and 14 before described, all lie in substantially the same vertical plane, and an endless chain 19 is led around these chain wheels after the manner shown on the drawing, by means of which motion is imparted from the motors 2 and 3 to the rudder 29 in a manner to be hereinafter pointed out. The worms connected to the motors 2 and 3 are preferably of the same pitch and are both cut right handed so that in the normal operation of the steering apparatus the motors will run in opposite directions. If desired, the worms may be cut left handed; also the pitch of the worms need not necessarily be the same, for, while the latter construction is operative, it involves other conditions which might not be altogether desirable when the same is used in connection with steering gear apparatus.

The operation of the apparatus is as follows. When the motors 2 and 3 are running at the same speed in opposite directions, the chain wheels 13 and 14 are rotated at a much slower speed, and so long as the motors 2 and 3 run at equal speeds the chain wheels 13 and 14 rotate at equal speeds in opposite directions. The endless chain 19 driven by the wheels 13 and 14 merely rotates the chain wheels 20 and 21 without exerting any tendency to rotate the wheel 24 and thereby alter the position of the rudder 29. Should the relative speed of the motors 2 and 3 vary, however, the wheel 24 is rotated and the position of the rudder altered. It is readily seen that if the chain wheel 13 is rotating in an anti-clockwise direction and the chain wheel 14 is also rotating at the same speed in a clockwise direction, that portion of the endless chain 19 which passes over the chain wheel 20 is payed out by the chain wheel 14 at the same rate as it is taken up by the chain wheel 13 and the length of chain passing around the chain wheel 20 lying between the chain wheels 13 and 14 is constant. The length of chain passing around the chain wheel 21 is likewise constant, since the total length of the endless chain 19 is fixed.

If now it be assumed that the relative speeds of the two motors is varied in such way that the motor 2 runs faster than the motor 3, the chain wheel 13 now takes up the portion of chain 19 passing over the chain wheel 20 faster than it is payed out by the chain wheel 14, with a resultant shortening of the upper half of the chain 19, and the chain wheel 20 is therefore pulled bodily in a left-handed direction, causing the wheel 24 to move in a counter-clockwise direction and thereby cause the rudder 29 to alter its position. If the motor 3 is caused to rotate at a faster speed than that of the motor 2 the wheel 24 is caused to move in a clockwise direction, due to a shortening of the lower half of the chain 19. Thus it is readily seen that by varying the relative speeds of the motors 2 and 3 the rudder 29 may be moved to any desired position and the course of the vessel thereby determined.

Referring now to Fig. 3, I will describe an electrical controlling apparatus which may be used if desired. The motor armatures 2' and 3' are connected in parallel to mains 95, 96, designated + and —, respectively, through the sectional starting resistance 94. 97 designates the main line switch, and 100, 101 independent switches for the motor armature circuits. The sectional resistance is controlled by a plurality of magnet switches which are arranged so as to cut out or short circuit the sectional starting resistance step by step in a prearranged order. The starting switch 102 controls either of the reversing switches, and the adjustable rheostat 103 controls the relative speeds of rotation of the motor armatures 2' and 3', after they have been started. The double rheostat 104 is automatically operated upon the movement of the wheel 24, to which it is either directly or otherwise connected so as to move therewith. The purpose of this double rheostat is to equalize the fields 114, 115 of the motors after the rheostat 103 has been operated, so as to bring the rudder to a stop. Assuming the main line switch 97 and the rheostat switch 129 to be closed, let the starting switch lever 116 be moved to the left so as to connect the same with the contact 117. Current will then flow from the + main to and through the wires 119, 120, blade 130 of the switch 129, wire 123, solenoid 124 of the reversing switch 99, wire 125, contact 117, lever 116, wire 126 to the — main. The core 127 of the reversing switch 99 will thereupon be lifted and also the contact plates 128, 131 carried thereby to effect a closing of the circuits to the motor armatures 2' and 3'.

The reversing switches 98 and 99 are similar in construction, and each comprises a core or plunger 127 provided with a stem 132 which rigidly connects the contact plates 128 and 131, so as to move with said plunger. These contact plates are insulated from the stem 132 and from each other, and are adapted to electrically connect the fixed contacts 133, 134 and 135, 136, 137, respectively. A stop 141 is fixed in the line of movement of the plunger to limit its downward movement. The solenoid switches 169, 170 and 171 control the sectional starting resistance 94 after the manner to be hereinafter described. Upon the operation of the reversing switch 99, a circuit may be traced from the + main, through the circuits indicated by heavy black lines, back to the — main by way of the fixed contacts 133, 134 and contact plate 128 of the reversing switch 99, sectional starting resistance 94, motor armature switches 100, 101, and motor armatures 2', 3' in parallel, wire 142, upper contacts 137, 135, and upper contact plate 131, and wires 143, 96. A circuit is normally established through the shunt fields 114, 115 in parallel at all times. This circuit may be traced from wire 144 at connection 146, to and through the wire 147, the arc-shaped contact strip 148, wiper 149, which is pivotally connected at 150, one of the contacts 158, the left-hand portion of the sectional resistance 151, wire 152, the left-hand portion of the resistance 153, one of the contacts 159, wiper 160 on the arm 110, arc-shaped strip 154, wire 155, the lower blade of switch 156, shunt field coil 115, upper blade of the field switch 156, wires 161, 126, wire 143, to the — main 96. The parallel circuit extends between the contact 158, which the wiper 149 engages, and the point 162 between the switches 156 and 157 and passes through the right-hand portion of the resistance 151, wire 163, left-hand portion of resistance 164, wiper 166, contact strip 167, wire 168, the upper blade of the field switch 157, shunt field coil 114 of the other motor and the lower blade of said switch 157. Therefore upon the operation of the reversing switch, current is sent through the motor armatures 2' and 3' to start the same, the shunt fields being already excited. The current flowing through the motor armatures is limited in amount by the sectional starting resistance 94 which may now be cut out gradually or step by step in order to increase the speed of the motors to normal running conditions. This is accomplished by means of the switches 169, 170 and 171 which are operated by the magnets comprising the solenoids 172, 173 and 174, respectively. These magnet switches are provided with plungers 178, 179 and 180, to which are rigidly connected the contact plates 175, 176 and 177 by means of the stems 181, 182 and 183, respectively. The contact plates 175, 176 and 177 are adapted to electrically connect the fixed contacts 184, 185 and 186, 187 and 188, 189, respectively.

When the reversing switch 99 operates as heretofore explained, a circuit is closed through the solenoids 172, 173 and 174 in series from the + main to the contact 133, contact plate 128, contact 134 to and through the solenoids 172, 173 and 174, and to the contact 136, contact plate 131, contact 135, wire 143 to the − main 96. The accelerating magnets are therefore connected across the main line as soon as the reversing switch 99 has operated to close its contacts.

As heretofore stated, it is desirable to have the accelerating magnets operate in a predetermined order; there are a number of well known ways to accomplish this, one of which consists in making the magnets of different strengths, another by providing each magnet with a dash-pot retarding device, so that by properly proportioning these parts the accelerating magnets will operate in any desired order and the time required by each magnet to close its contacts may be regulated to any desired interval. As herein shown, the magnet switch 169 is arranged to close its contacts first, shortly afterward the magnet switch 170 closes its contacts, and finally the magnet switch 171 closes its contacts. In this manner the sectional starting resistance 94 is not cut out of circuit too rapidly and the motors are started smoothly and without excessive flow of starting current.

Having run both motors up to full speed, suppose it is desired to alter the position of the rudder. As before pointed out, this is accomplished by varying the relative speed of the motor armatures 2' and 3'. The means for varying this relative speed comprises the rheostats 103 and 104 for changing the excitation of the shunt fields of the motors. The fields are of the same strength when the wipers 149, 160 and 166 are in their central vertical positions, as shown, and in this case the same amount of resistance is in series with each field coil.

Let it be assumed that the wiper 149 is moved toward the left so as to increase the resistance on one side and decrease it on the other. It will be remembered that in tracing the circuits through the field coils 114 and 115 in parallel the wiper 149 was the beginning of the parallel circuits which continue through the wires 152, 163, rheostat 104, wires 155, 168, and thence to the shunt field coils 115 and 114. More resistance is now placed in series with the field coil 114 and an equal amount taken from the circuit including the field coil 115. The field coil of motor 2 having been weakened, the motor armature will increase in speed, while that of motor 3 having been strengthened will decrease in speed. This relative difference in speeds of the two motors produces a rotation of the wheel 24, as before pointed out, and the rudder therefore takes up a new position.

As before explained, when the rudder is moved the resistance varying arm 110 is moved in such a direction that the field strengths are equalized, that is, it is moved until the same amount of resistance is again placed in series with each shunt field winding, whereupon the motors will again rotate at the same speed and the rudder will discontinue its movement and remain stationary. For instance, if the wiper 149 is moved to the left to increase the speed of the motor 2, and at the same time decrease the speed of motor 3, the resistance varying arm 110 will move with the rudder in a clockwise direction, and consequently more of the resistance 153 will be inserted in the circuit of shunt field 115 of motor 3 and a portion of the resistance 164 will be cut out of the circuit of the shunt field 114 of motor 2. The sum of the resistances in series respectively with the shunt field coils will now be the same and the armatures 2' and 3' will rotate at the same rate of speed. This is made clear by a tracing of the parallel circuit from the wiper 149 through the resistance 151 of the manual rheostat 103, wires 152, 163, resistances 153, 164 of the automatic rheostat 104, wipers 160, 166, wires 155, 168, and field coils 115, 114 as before.

Should the rudder move beyond its intended extreme end of movement the arm 111 of the rheostat 104 would strike against the pivoted lever 246 and open the contact 121. The switch 129 being in open position, the opening of the contacts 121 would cause a deënergizing of the solenoid 124 and therefore a cutting off of the current from the motors and the same would come to rest, securely holding the rudder from further movement. If the switch 129 is closed, however, the limit switches 121 and 251 would be inoperative, as the blades 130 and 131 are respectively in parallel with said limit switches.

Ordinarily, after the manually operated reversing switch 102 has been closed it may be left in closed position and the steering gear controlled by means of the manual rheostat 103 alone. In this case it is better to have the switch 129 in open position, rendering the limit switches 121 and 251 operative, otherwise there would be the possibility of moving the rudder beyond its normal limit of movement.

Should one of the limit switches 121 or 251 be operated to open the circuit to the reversing switch 98 or 99 last operated, the electric controlling apparatus will be restored to normal, the motors stopped and the rudder held stationary. It will be noticed, however, that the limit switch thus operated will be held open and, therefore, in order to release the rudder or move it back, the other reversing switch may be operated by reversing the manual switch 102. If desired, however, the switch 129 alone may be closed, the switch 102 left in its present position, and the wiper 149 moved back toward its central position.

Should one of the motors 2 or 3 become disabled or inoperative it may be disconnected from circuit by means of the hand switches in circuit with its armature and field and the other motor used alone. In this event the wiper 149 is brought to its extreme left-hand position so as to connect the contacts 247 and the motor controlled entirely by means of the switch 102. In thus operating the steering mechanism with one motor alone it is preferable to have the switch 129 in its open position, so that the limit switches 121 and 251 will be effective to automatically stop the rudder at the limit of its travel.

It should be noted that when the wiper 149 is moved to its left-hand limit so as to connect the contacts 247, all resistance is cut out from in series with the shunt field coils 114 and 115 and the connected motor will run at its slowest speed with maximum field strength. When only one motor is used the armature and field switches of its companion motor are opened. If desired the motor shafts could be provided with brake applying means adapted to be released by electro-magnets connected so as to operate whenever the motors receive current and to be applied whenever current is cut off from either or both motors.

In the modified construction shown in Fig. 2, the two motors are mounted in the casings 2ª and 3ª. The motor shafts 4' and 4" are in this instance arranged vertically, and have secured to their lower ends the spur pinions 5', 5", meshing respectively with the internal gear teeth of the gear wheels 6', 6". Beneath the gear wheels 6', 6", and secured for rotation therewith, are the chain sprocket wheels or pulleys 14', 13' corresponding to the pulleys 14, 13 of Fig. 1. Keyed to the upper end of the rudder shaft 28 is a horizontal lever or tiller 24'. Sprocket wheels 20', 21' are journaled on the tiller near its opposite ends, and the endless chain 19' engages these sprocket wheels and the sprocket wheels 13', 14'. The operation of the mechanism just described is like that of Fig. 1 and needs no further description.

In connection with the mechanism just described, I have shown a hydraulic brake which operates automatically when the motors are stopped to lock the rudder 29 against movement in either direction. This brake comprises a cylinder 63 in which reciprocates the piston 62 having a piston rod 60 which passes through a stuffing-box 64 in one of the cylinder heads. The outer end of the piston rod is secured to a cross-head 58 which works in stationary guides 59. A link 55 is pivoted at one end to the cross-head 58, and at its opposite end is pivoted at 54 to the end of the tiller 24' which extends a short distance beyond the sprocket wheel 20'. The cylinder 63 is provided with ports 68 and 69 near its opposite ends and these ports are connected by a by-pass 70 which establishes communication between the ends of the cylinder. A rotary valve 72 is placed in the central portion of the by-pass 70, and may be operated in any suitable manner. As here shown, the valve carries a pinion 86 engaged by a rack 73 at the end of a rod 80. This rod 80 may be secured to or formed integral with the core 82 of an electromagnet comprising the frame 83 and winding 84. When the magnet is deënergized the valve 72 is held in its closed position, as shown, by the coil spring 81 re-acting between the magnet frame and the collar 85 to hold the core 82 in its outward position. The magnet coil 84, as shown in Fig. 3, is connected across the mains between the reversing switches and the motor armatures, so that it will be energized whenever the motors, or either of them, are receiving current. The cylinder 63 and by-pass 70 are preferably filled with a substantially non-compressible fluid, as oil or water. In operation, when the reversing switch lever 116 is moved in either direction and one of the reversing switches closed, the magnet coil 84 is energized and the valve 72 rotated to open position. The fluid in the hydraulic brake may then circulate freely through the by-pass 70, and offers no material resistance to the movement of the piston 62 when the rudder 29 is moved. But when the reversing switch is opened, either manually, as by the operation of the switch lever 116, or automatically, as by the operation of the limit switch 121, the magnet coil 84 will be deënergized and the valve 72 moved to closed position.

The piston 62 is now securely held against movement in either direction, and thus operates as a brake to hold the tiller in a fixed position. This prevents any injurious strain or vibration due to lateral pressure on the rudder being transmitted to the motors or intermediate gearing. It also holds the rudder locked in any desired position, and when the rudder has been moved in either direction to its normal limit of movement and operates the limit switch, it is automatically locked against further movement.

Obviously, the hydraulic brake may be applied to the construction shown in Fig. 1 as well as in Fig. 2. It will be noted, however, that in Fig. 1 the worm gearing serves to perform certain functions of the hydraulic brake, that is, it prevents any back movement being transmitted from the rudder to the motors. In other words, the worm gearing prevents any vibrations or strain being transmitted from the rudder to the motors, and also locks the rudder against movement except as positively operated by the motors.

In order to indicate the position of the rudder at all times, and particularly when one motor alone is used, I sometimes provide an indicator of any suitable construction, but preferably having a pointer moving over a graduated scale, said indicator being connected in some suitable way to some moving part of the steering gear apparatus. In Fig. 2 I have shown such an indicator 57, in which a pointer 90 is keyed to a shaft 91, rotated by means of a crank arm 92, and a link 56 connecting the crank arm and the cross-head 58. A graduated scale 93 indicates the position of the pointer which always corresponds with that of the rudder.

Obviously those skilled in the art may make various changes in the details of construction and arrangement of parts without departing from the spirit and scope of my invention, and I wish therefore not to be limited to the precise construction disclosed.

What I claim is:—

1. In a steering device, the combination with a rudder, of a plurality of motors, means for simultaneously driving the motors at a predetermined relative speed, means for varying said relative speed, drive sheaves connected to the motors and having the same peripheral speed when said relative speed of the motors is maintained, a flexible member driven by said sheaves, a driven sheave engaged by said flexible member and moved by a variation in the relative peripheral speed of the drive sheaves, and connections between the driven sheave and the rudder for operating the rudder upon the movement of the driven sheave.

2. In a steering device, the combination with a rudder, of a plurality of motors, drive sheaves geared to the motors, an endless chain or cable engaging the drive sheaves, a direction sheave engaged by the chain or cable and moved by an unequal peripheral speed of the drive sheaves, and driving connections between the direction sheave and rudder.

3. In a steering device, the combination with a rudder, of a pivoted member, a sheave journaled on said member, a chain or cable engaging the sheave, means for operating the two leads of the chain or cable extending from the sheave at different speeds, and thereby causing a rotary movement of said pivoted member, and driving connections between said member and the rudder.

4. In a steering device, the combination with a direction sheave, of drive sheaves each located on the same side of the direction sheave, a flexible member engaging the direction sheave and having its two leads extending to the drive sheaves, means for rotating the drive sheaves at the same or different relative speeds to either rotate or move the direction sheave bodily, a rudder, and driving connections between the direction sheave and the rudder.

5. In steering apparatus, the combination with a rudder, of a pivoted member, direction sheaves journaled to said member on opposite sides of its pivot, a pair of drive sheaves both located at the same side of the pivoted member, an endless driving member engaging the drive sheaves and direction sheaves, manually controlled means for rotating the drive sheaves either at the same or different peripheral speeds, and a driving connection between the rudder and said pivoted member.

6. In steering apparatus, the combination with a plurality of driving elements, of a driven element having a combined movement of translation and rotation, flexible differential driving connections between said driving and driven elements, and a rudder operated by the driven element.

7. In steering apparatus the combination with a plurality of motors, of worm shafts, worm wheels, a driven element, a rudder connected to said element and positive differential driving connections comprising a flexible endless driving member between the worm wheels and said element.

8. In steering apparatus the combination with a plurality of motors, of horizontal worm shafts, vertical worm wheels, a driven element, positive differential driving connections comprising a flexible driving member between the worm wheels and said element and a rudder connected to said element and movable thereby in either direction from a central position.

9. In steering apparatus the combination with a plurality of horizontal worm shafts and worms on the shafts, of worm wheels, having different axes of rotation, means for driving said shafts at relatively variable speeds, a driven element, positive differential driving connections between said element and the worm wheels, and a rudder connected to said element.

10. The combination with a plurality of electric motors having horizontally disposed armature shafts, of driving elements connected to said shafts, vertically disposed gear wheels, a flexible driving member operated by said gear wheels, and a driven member rotated by the differential movement of the gear wheels.

11. In steering apparatus, the combination with a plurality of motors, of parallel worm shafts connected to the motors, worm wheels, chain pulleys carried by said wheels, an endless chain engaging the pulleys, means for varying the relative speed of the motors to impart a differential movement to said pulleys, and a rudder operatively connected to said chain.

12. In steering apparatus, the combination with a rudder, of a plurality of chain pulleys, an endless chain engaging said pulleys, a motor operatively connected to said pulleys, and driving connections comprising miter gearing between one of said pulleys and the rudder.

In testimony whereof, I have signed my name to this specification in the presence of two subscribing witnesses.

AUGUST SUNDH.

Witnesses:
  CHAS. M. NISSEN,
  JAMES D. IVERS.